(12) United States Patent  (10) Patent No.: US 7,424,842 B1
Kempski et al.  (45) Date of Patent: Sep. 16, 2008

(54) FIBER CHOPPER

(75) Inventors: Douglas J. Kempski, Holland, OH (US); Michael David Folk, Oregon, OH (US)

(73) Assignee: Johns Nanville, Denver, CO (US)

( * ) Notice: Subject to any disclaimer, the term of this patent is extended or adjusted under 35 U.S.C. 154(b) by 409 days.

(21) Appl. No.: 10/919,570

(22) Filed: Aug. 17, 2004

(51) Int. Cl.
B23D 17/00 (2006.01)

(52) U.S. Cl. .................. 83/436.1; 83/436.6; 83/346; 83/347; 83/913; 83/950

(58) Field of Classification Search ............... 83/105, 83/109, 111, 113, 158, 159, 160, 162, 165, 83/166, 913, 950, 436.6, 436.1, 102, 345–347
See application file for complete search history.

(56) References Cited

U.S. PATENT DOCUMENTS

| | | | |
|---|---|---|---|
| 3,508,461 A | 4/1970 | Stream | |
| 3,869,268 A | 3/1975 | Briar et al. | |
| 4,083,279 A | 4/1978 | Wester et al. | |
| 4,249,441 A | 2/1981 | Sturtz | |
| 4,287,799 A | 9/1981 | Fujita et al. | |
| 4,398,934 A | 8/1983 | Willis et al. | |
| 4,411,180 A * | 10/1983 | Roncato | 83/37 |
| 4,528,050 A * | 7/1985 | Arther et al. | 156/62.4 |
| 4,551,160 A | 11/1985 | Frailey et al. | |
| 5,970,837 A | 10/1999 | Arterburn | |
| 6,598,814 B2 * | 7/2003 | Bascom et al. | 440/88 F |

* cited by examiner

Primary Examiner—Boyer D. Ashley
Assistant Examiner—Omar Flores-Sánchez
(74) Attorney, Agent, or Firm—Robert D. Touslee

(57) ABSTRACT

A method and apparatus for separating long, unwound items like fiber, fiber strands, yarn, etc. into short lengths. The apparatus has a backup roll, a blade roll, an idler roll, and a new-strand starting mechanism. The improvements include a guide roll for the items spaced from and located upstream of the apparatus and a movable, two-part idler roll on the apparatus for increasing the width of a separating portion of the backup roll.

13 Claims, 2 Drawing Sheets

FIBER CHOPPER

BACKGROUND

The present invention involves an improved chopper for chopping continuous or very long loose items such as fiber, fiber strands, yarn, wire, string, ribbon, tape and the like by pulling the item(s) into the chopper while the loose items are held tightly against the surface of a rotating backup roll and carrying the item(s) on into a nip between a rotating blade roll and the rotating backup roll where they are separated into short pieces. More specifically the present invention involves a chopper having improved mechanisms and features.

It has long been known to chop continuous fibers or fiber strands into short lengths of about 3 inches or shorter. Billions of pounds of such product including chopped glass fibers and fiber strands are produced each year in process and chopping apparatus such as disclosed in U.S. Pat. Nos. 5,970,837, 4,551,160, 4,398,934, 3,508,461, and 3,869,268, the disclosures of which are incorporated herein by reference. The choppers disclosed in these patents comprise a blade roll containing a plurality of spaced apart blades for separating the fibers into short lengths, a backup roll, often or preferably driven, which the blades work against to effect the separation and which pulls the fibers or fiber strands and in some cases, an idler roll to hold the fibers or fiber strands down onto the surface of the backup roll. In the chopped fiber processes disclosed in these patents, the chopper is often the item most limiting the productivity of the processes. These processes typically operate continuously every day of the year, 24 hours each day, except for furnace rebuilds every 5-10 years.

The above choppers must be serviced every few hours, shifts or days, depending on the type of material being chopped, to replace a worn backup roll, a blade roll, or both and sometimes other components of the chopper. These service shutdowns of the chopper often mean that all of the bushings being served by the chopper are not only disrupted, but do not produce any salable product until the chopper is again running and the strands from each of the bushings have been restarted into the chopper. It usually takes 10-15 or more minutes to stop and service the chopper and to restart all of the 5-14 bushings that are normally served by the chopper. The fiberizing bushings usually do not run well for the first hour or two after a chopper service shutdown because the bushings loose their temperature equilibrium and uniformity during the disruption and it takes a period of time to regain the desired equilibrium. During this time the productivity is also reduced and the manual labor demand is increased.

Any improvement in the chopper that would allow the chopper to pull and chop faster and/or for longer times between service shutdowns, and/or to pull and chop more fibers or fiber strands at a time would have an extremely positive impact on productivity and production costs. The invention comprises improvements to the type of chopper shown in U.S. Pat. No. 4,551,160. Problems exist with this type of chopper that cause interruptions in production limiting productivity and causing higher than necessary manufacturing costs. Some of these problems are strand breakage in the chopper prior to chopping and resulting roll wraps. Each running strand, due to the high speed it is being pulled and the nature of the strand, is subject to being broken by interference from the loose end of a broken strand, fuzz clumps comprised of a web of chopped or broken fibers, and the worn, rough surface of the backup roll. When a strand breaks, the productivity of the fiberizing bushing is lost for a few minutes until the bushing beads down and the resulting new fiber strand is started back into the chopper. Also, too frequently, when a strand breaks at the chopper, an idler roll wrap or a strand guide roll wrap resulting in or requiring most or all of the strands to be broken out, the wrapped roll cleared of the wrapped strand or strands, and each of the fiber strands from each of the fiberizing bushings laced back into the chopper. Typical production time lost for the entire bushing leg from a roll wrap is about ten minutes.

SUMMARY OF THE INVENTION

The present invention is an improved chopper for separating long lengths of one or more unwound items selected from a group consisting of fibers, fiber strands, wires, strings, tape(s), strip(s) and ribbon(s) into short lengths. One or more of, preferably a plurality of, the long lengths of material are pulled into the chopper in an unwound form at speeds exceeding 1,000 FPM, preferably at speeds exceeding 2000 FPM, first by passing over an idler roll, a starting roll on a starting arm and on into a nip of opposed peripheral surfaces of a pair of pull rolls, and subsequently by a moving elastomer layer on a peripheral working surface of a rotating backup roll. The latter carries the item(s) on into a nip between the elastomer working layer and blades of a rotating blade roll. Both the blade roll and the backup roll are outboard of a front of a cabinet that contains the conventional drive and roll biasing members. The improvement comprises any one or any combination of; (A) a strand guide, preferably oscillating, for the running strands that is located upstream of the chopper, (B) a new improved, movable two part idler roll for avoiding roll wraps and increasing the chopping width on the backup roll, and (C) a shield located between the backup roll and the strand guide to protect the strand guide from stray flying separated item(s). Preferably at least two of the improved features are used and most preferably all three improvements are used on the chopper.

The invention also includes a method of chopping items as described above using the improved chopper described above having one or both of the improvements described above to separate the items into short lengths while optimizing backup roll working layer life and blade lives and increasing chopping speed and productivity.

When the word "about" is used herein it is meant that the amount or condition it modifies can vary some beyond that so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without unexpected characteristics, those embodiments are within the meaning of the term about as used herein. It is not difficult for the skilled artisan or others to determine whether such an embodiment is either as might be expected or, because of either a break in the continuity of results or one or more features that are significantly better than reported by the inventor, is surprising and thus an unobvious teaching leading to a further advance in the art.

DETAILED DESCRIPTION OF THE INVENTION

Figure 1:
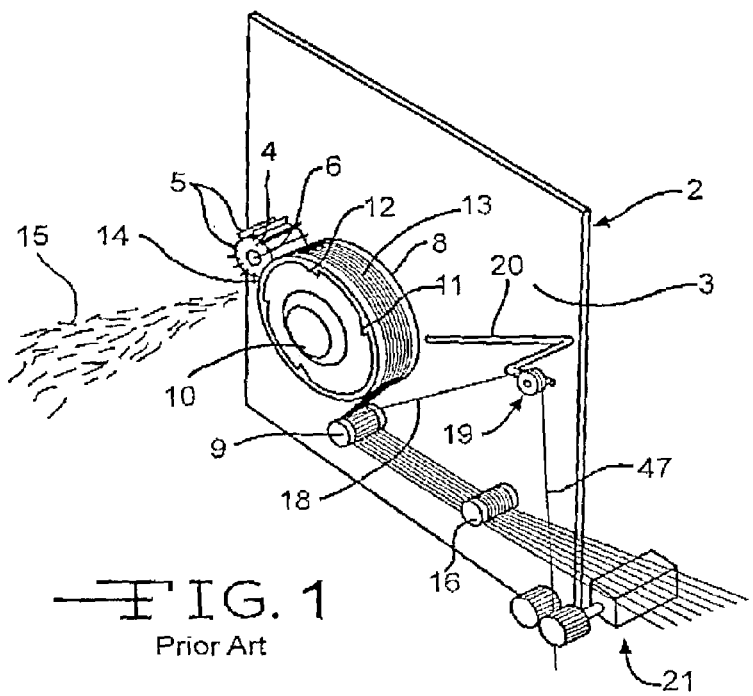
FIG. 1 is an elevational perspective view of a portion of a prior art chopper.

FIG. 1 shows a front elevation perspective view of a portion of a prior art chopper 2, of the type shown in U.S. Pat. No. 4,551,160, and that is used in making chopped strand glass fiber. It comprises a cabinet front 3, a blade roll 4 with spaced apart blades 5 contained in slots and projecting from the periphery of an integrated hub 6, a backup roll 8 and a free-wheeling idler roll 9. The blade roll 6 is usually made entirely of metal, but can be made using a thermoplastic material to hold spaced apart blades such as the blade rolls shown in U.S. Pat. Nos. 4,083,279, 4,249,441 and 4,287,799, the disclosures of which are herein incorporated by reference.

The backup roll 8 is held on a spindle (not shown) with a hub 9 and also has a metal rim 11 on which is a notch and projection 12 for starting a new strand 7 of fibers into the chopper. The backup roll 8 is biased against the blade roll 4 until the blades 5 press into the working layer of the backup roll 8 a proper amount forming a nip 14 to break or separate fiber strands 1 into an array of short length or chopped strands 15.

One or more, usually five or more and up to 14 or more strands 1, such as glass fiber strands, each strand containing 400-6000 or more fibers and usually having water and/or an aqueous chemical sizing on their surfaces, are pulled by the backup roll 8 into the chopper 2 and the nip 14. The strands 1 first run under a grooved guide roll 16, preferably with one or two strands 1 in each groove, and upward and over a working surface 13 of the backup roll 8, i.e. the exposed peripheral surface of the backup roll 8 on which the running strands 1 lay against and are supported while being severed by blades 5 on the blade roll 4. The working surface of the back up roll 8 is typically wider than the oscillating path of the glass fiber strands 1. The strands 1 then pass under the outer surface of the free-wheeling idler roll 9, which is located to provide sufficient contact of the strands 1 on the surface of the backup roll 8 to enable the latter to pull the glass fiber strands 1.

When a new strand 18 is ready to be started into the prior art chopper it is pulled to the front of the chopper 2 by the operator and pulled under the separator roll 16 and the idler roll 9 and up over a fixed, preferably non-freewheeling starter roll 19 attached to the end of a pivoting arm 20 and down between a nip of a pair of driven pull rolls, part of a conventional pull roll assembly 21, that pull the new strand 18 at a first low speed and deliver the new strand into a conventional scrap processing system, scrap bin or scrap basement. After the new strand 18 is being pulled by the pull roll assembly 21 at a low initial speed, the pull rolls 21, the pulling speed of the pull rolls 21 is ramped up to bring the new strand 18 to at least close to the speed of the strands 1 running into the chopper 2. When that speed is reached, the pivot arm 20 is pivoted counterclockwise to start the new strand 18 into the chopper 2 in the manner disclosed in U.S. Pat. No. 4,551,160.

Figure 2:
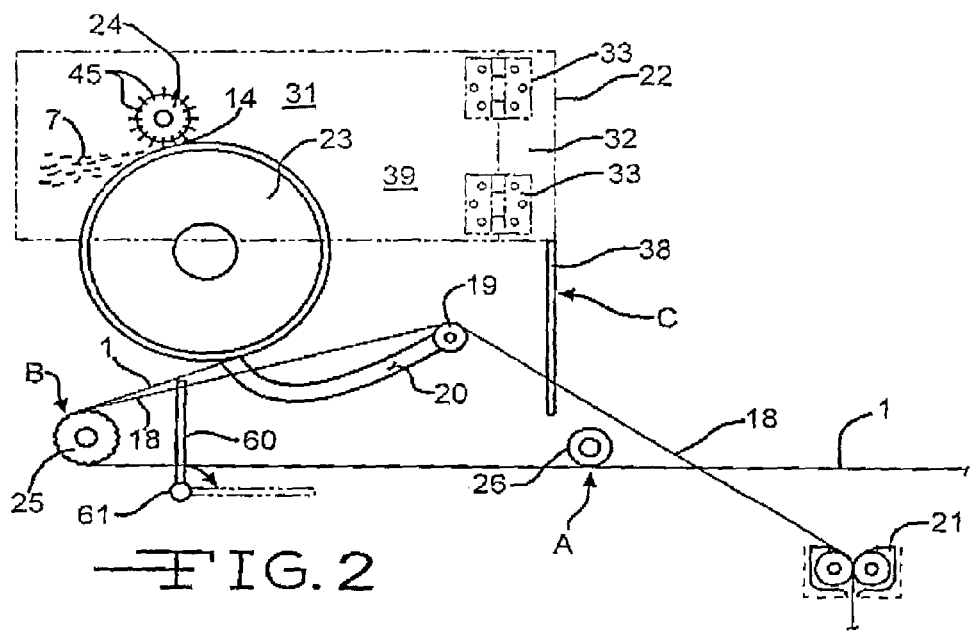
FIG. 2 is an elevation view of a portion of the chopper showing the several improvements of the invention described herein.

The improvements to the chopper, according to the present invention, are shown in FIG. 2 and in more detail in other figures described below. The chopper 22 comprises a frame 32, a front wall 39 and in front of the front wall are a backup roll 23 having a working surface 41, a blade roll 24 with a plurality of spaced apart blades 45, moved to a position to discharge the chopped strands 7 in a generally diagonal direction, an idler roll 25, a starter arm 20 and a starter roll 19.

Figure 3:
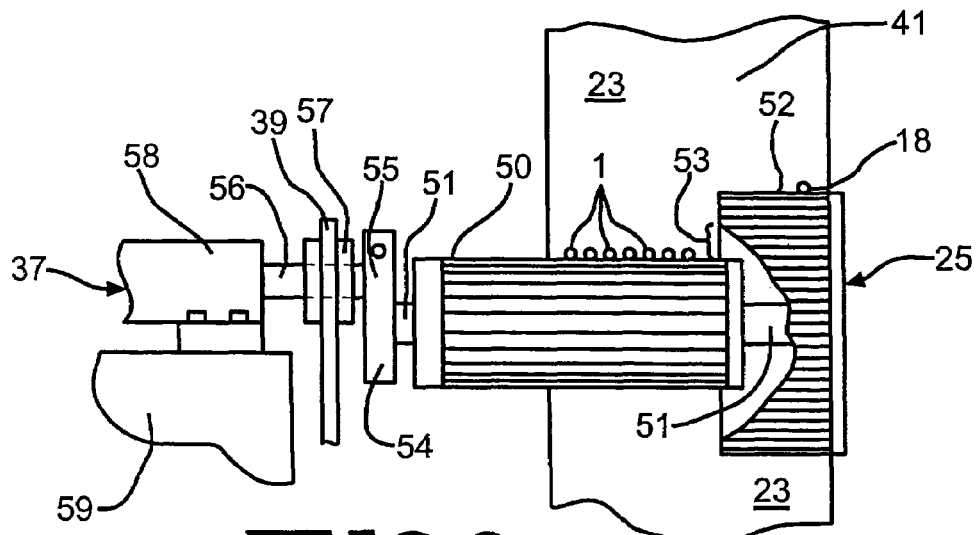
FIG. 3 is an elevation view of an idler roll in a starting position and a portion of the mount for moving the idler roll according to the present invention with a portion of one part of the idler roll cut away to show its relation to another part of the idler roll.
Figure 4:
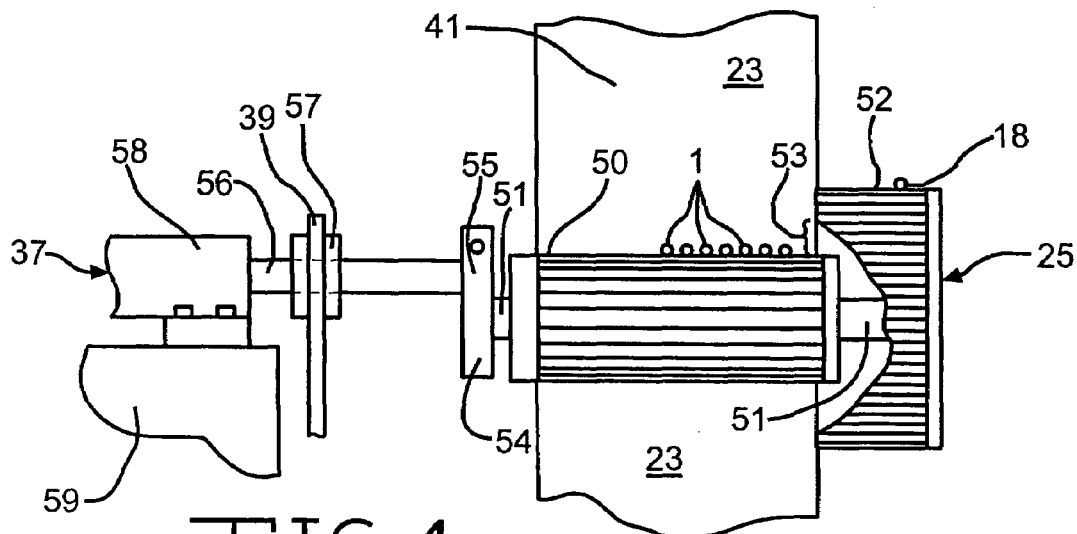
FIG. 4 is an elevation view of the idler roll in a running position and a portion of the mount for moving the idler roll according to the present invention with a portion of one part of the idler roll cut away to show its relation to another part of the idler roll.

The first improvement, designated A in FIG. 2, comprises an improved free-wheeling idler roll 25 and a moving mount, the former being in a different location, to produce superior results to prior art idler rolls. The idler roll 9 shown in the chopper disclosed in U.S. Pat. No. 4,551,160, has a constant diameter and this idler roll 9 is located below the backup roll 8 at a position of about 5 or 5:30 o'clock off of the backup roll 8. The idler roll 25 of the present invention is substantially different in construction and action, and preferably is also in substantially different location, than the prior art idler roll 9. The improved idler roll 25 and mount 37 of the present invention is shown in FIGS. 3 and 4. FIG. 3 shows the idler roll 25 in a position when operating with running strands 1 and a new strand 18 just being started into the chopper 22. The improved idler roll 25 has two sections for strand contact, a first section 50 having a first diameter and having a similar shape of the prior art idler roll 9, but comprised of different construction, and a second section 52 that is adjacent to and overlaps the end of the first section 51. The second section 52 has the same axis as the first section 50, but a second, larger, diameter. Both sections of the idler roll 50,52 have a common fixed axle 51 that does not rotate. Both the first section 51 and the second section 52 are mounted to the axle 51 with conventional bearings allowing both to be free-wheeling, both sections being rotated by contact with either the running strands 1 or a new strand 18.

The axle 51 is held by an arm 54 in a fixed, non-rotating manner. An end portion 55 of the arm 54 is attached in a fixed, non-rotating manner to a piston rod 56 of a fluid, gas or liquid powered, cylinder 58. The hydraulic cylinder 58 is mounted behind the front wall 39 of the chopper 22 on a member 59 of the chopper frame 32. The piston rod 56 is supported by the hydraulic cylinder 58 and by a bushing 57 slideably surrounding the piston rod 56 and mounted in a hole (not shown) in the front wall 39 in a conventional manner. The hydraulic cylinder 58 can be operated with compressed air or other hydraulic fluid at elevated pressure in the normal manner. The hydraulic cylinder can also be replaced by various mechanical means, as one skilled in the art will recognize after reading this disclosure, that will move the idler roll 25 in the same or similar manner shown in FIGS. 3 and 4. A movable rod 60 attached to a rotatable shaft 61 is in a vertical position to hold the new-strand 18 in the desired location on the second section 52 of the movable idler roll 25. At the appropriate time, when ready to move the strand onto the working layer 41, the shaft 61 is rotated to move the rod 60 out of contact with the new-strand 18 allowing the new-strand 18 to move onto the first section 50 to become one of the running strands 1.

FIG. 3 shows the position of the idler roll 25 when a new strand 18 is on the second section 52 very soon after lacing the new strand into the pull rolls 21. As soon as the new strand 18 has been accelerated to at least near the speed of the running strands 1, a rod 60, preferably brass and mounted on a rotatable shaft 61 extending out of the front wall 3, holding the new strand onto the second section 52 is withdrawn, preferably by rotating shaft 61 clockwise sufficiently to clear the new strand 18, allowing the new strand to move off of the second section 52 and onto the first section 50 to join the running strands. This occurs as the new strand 18 is being transferred to the working surface of the backup roll 23 as will be seen later.

Once the new strand 18 has moved to the first section 50, the hydraulic cylinder 58 is energized to move the idler roll 25 to the position shown in FIG. 4, the running position. Without this movement of the idler roll 25 between a running and starting position, much less, about 25 percent less, than the entire width of the working surface of the backup roll 23 can be used for chopping the running strands, but by moving the idler roll 25 to start a new strand on the new section 52, a substantially wider portion of the working surface of the backup roll 23 can be used, increasing the life of the backup roll 23 significantly. In prior art choppers using an unmovable idler roll the width of the working surface of the backup roll used for chopping the running strands 1 was about 11.4 cm, but when the movable idler roll 25 width of the working surface of the backup roll used to chop running strands 1 is increased to about 15.2 cm. Also, the movable idler 25 shown in FIG. 3 provides substantially improved success in starting new strands into the chopper with substantially fewer aborted starts than the prior art system.

A clearance 53 between an inside diameter of the second section 52 and an outside diameter of the first section 50 is sufficient that when the first section 50 is being driven by running strands 1, its rapid rotation does not cause more than a very slow rotation of the second section 52 when no new strand 18 is on the second section 52. The clearance 53 should be at least about 0.05 cm and preferably about 0.038 cm. A smaller clearance can cause the second section 52 to rotate fast enough, due to friction with the rapid movement of air close to the surface of the outer surface of the first section 50, to jerk the new strand 18 when it comes into contact with the outer surface of the second section 52 to occasionally break out the new strand 18. The independence of the two sections 50,52 allows the first section 51 to rotate to produce a different surface speed than that of the second section 52. The still or only very slow rotation of the second section 52 produces superior performance in starting a new strand 18 because it does not jerk the slow moving new strand 18 when first contacting the surface of the second section 52 during lacing in of the new strand 18. A preferred material for the idler 25 is 440C stainless steel with a finish of about 30 microinches and a Rockwell C scale hardness of about 62.

The new strand 18 first runs, or moves, at a slower surface speed than the strands 1 are running, and then, after having been placed over the starter roll 19 and put into the pull rolls 21, is then accelerated up to at least close to the running speed of the running strands 1 prior to being transferred to the backup roll 23 and nip 14.

Another improvement involves removing the prior art oscillating strand guide roll 16 from the chopper and positioning an oscillating strand guide roll 26 upstream of the chopper 22 as shown in FIG. 2. In this location, the oscillating strand guide roll 26 provides substantially better performance by removing it from a "dirty" area of the chopper, i.e. an area occasionally bombarded by flying fuzz clumps and chopped fiber and chopped strands 7 that have first adhered to the surface of the backup roll 23 and then were thrown off in the wrong direction, and also by flying water spray and chemical sizing spray from the backup roll 23. In many fiberizing operations the operator has to place each strand 1 in a particular groove in the strand guide roll and it is much easier, and safer, to do this upstream of the chopper than closer to the rapidly spinning backup roll 23. The strand guide roll 26, that oscillates the running strands, is adjustable vertically to optimize the strand path and to minimize the strand tension on the running strands 1.

Figure 5:
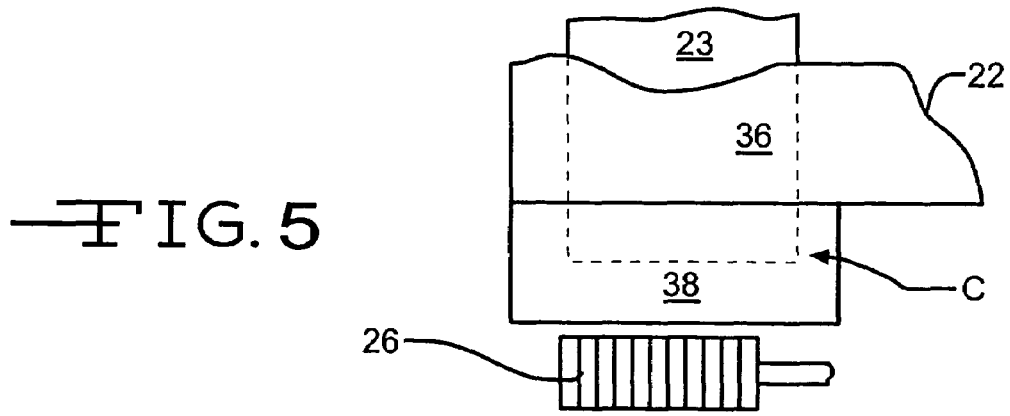
FIG. 5 is a partial side view of the chopper shown in FIG. 2 showing the position of a feature of the invention.

The next improvement, designated C, is a shield 38 attached to the frame 32 or a side of the chopper 22 and located between the home position of the start up roll 19 and the strand guide 26 to prevent chopped strand 7, etc. from being thrown from the backup roll 23 onto strands 1 running into the chopper and to protect the operator when he positions each new strand 18, or repositions a running strand, on the strand guide 26, see FIGS. 2 and 5.

Many variations of the above improvements will be obvious to those of ordinary skill in the art given the above disclosure and these obvious variations and modifications are covered by the scope of the claims below.

The invention claimed is:

1. A chopper for separating long lengths of unwound item(s) selected from the group consisting of fibers, fiber strands, string, yarn, wire, tape and ribbon into short pieces comprising a frame, a cabinet front, an idler roll, a rotatable backup roll outboard of one side of the cabinet front having a peripheral working layer, the backup roll having a peripheral working layer with a peripheral working surface, a rotatable blade roll outboard of the cabinet front, the blade roll having a plurality of blades spaced apart around its periphery for contact with and penetration of said item(s) and the peripheral working surface, and a new-strand starting system comprising a starter roll mounted on a pivoting arm, the improvement comprising a movable, two-section idler roll comprising a first section and a second section for avoiding roll wraps and increasing a width of chopping on the backup roll, both sections being for contact with the long lengths of unwound item(s), the second section having a larger diameter than the first section, wherein the movable, two-section idler roll comprises an axle, a free-wheeling first roll mounted on the axle with bearings and a free wheeling second roll also mounted on the axle with bearings, the second roll having a larger outside diameter than the first roll and an edge of the second roll extending past an outboard edge of the first roll, the clearance between an inside surface of a part of the second roll that extends past the outboard edge of the first roll and an outside surface of the first roll being at least about 0.038 centimeter and sufficient that rapid rotation of the first roll does not cause more than a very sow rotation of the second roll so that the second roll does not jerk a slow moving new strand when the new strand first contacts the surface of the second roll of the idler roll during lacing in of the new strand.

2. The improved chopper of claim 1 wherein the chopper further comprises a guide roll for guiding the item(s) running into the chopper, the guide roll being located upstream of and spaced from the chopper and a shield for the guide roll, the shield located between the guide roll and the backup roll.

3. The chopper of claim 2 wherein the guide roll oscillates back and forth generally parallel to a peripheral surface of the peripheral working layer of the backup roll to move the running item(s) back and forth across the peripheral surface of the working layer of the backup roll.

4. The chopper of claim 1 wherein the clearance between the inside surface of the that part of the second roll that extends past the outboard edge of the first roll and an outside surface of the first roll is at least about 0.9 centimeter.

5. The chopper of claim 4 wherein the chopper comprises a mechanism for moving the movable two-section idler roll in a direction that keeps peripheral surfaces of both the first roll and the second roll generally parallel with said working surface of the backup roll from a first position to a second position, the second roll being aligned with a portion of the working surface of the backup roll in the first position and being outboard of said working surface in the second position.

6. The chopper of claim 1 wherein the clearance between the inside surface of the second roll and the outside surface of the first roll is at least about 0.05 centimeter.

7. The chopper of claim 6 wherein the item is at least one strand comprised of glass fibers.

8. The chopper of claim 6 wherein the chopper comprises a mechanism for moving the movable two-section idler roll in a direction that keeps peripheral surfaces of both the first roll and the second roll generally parallel with said working surface of the backup roll from a first position to a second position, the second roll being aligned with a portion of the working surface of the backup roll in the first position and being outboard of said working surface in the second position.

9. The chopper of claim 1 wherein the chopper comprises a mechanism for moving the movable two-section idler roll in a direction that keeps peripheral surfaces of both the first roll and the second roll generally parallel with said working surface of the backup roll from a first position to a second positions the second roll being aligned with a portion of the working surface of the backup roll in the first position and being outboard of said working surface in the second position.

10. The chopper of claim 2 wherein the chopper comprises a mechanism for moving the movable two-section idler roll in a direction that keeps peripheral surfaces of both the first roll and the second roll generally parallel with said working surface of the backup roll from a first position to a second position, the second roll being aligned with a portion of the working surface of the backup roll in the first position and being outboard of said working surface in the second position.

11. The chopper of claim 9 wherein the item is at least one strand comprised of glass fibers.

12. The chopper of claim 1 wherein the item is at least one strand comprised of glass fibers.

13. A chopper for separating long lengths of unwound item(s) selected from the group consisting of fibers, fiber strands, string, yarn, wire, tape and ribbon into short pieces comprising a frame, a cabinet front, an idler roll, a rotatable backup roll outboard of one side of the cabinet front having a peripheral working layer, the backup roll having a peripheral working layer with a peripheral working surface, a rotatable blade roll outboard of the cabinet front, the blade roll having a plurality of blades spaced apart around its periphery for contact with and penetration of said item(s) and the peripheral working surface, and a new-strand starting system comprising a starter roll mounted on a pivoting arm, the improvement comprising a movable, two-section idler roll for avoiding roll wraps and increasing a width of chopping on the backup roll, the two-section idler roll comprising an axle, a free-wheeling first roll mounted on the axle with bearings and a free wheeling second roll also mounted on the axle with bearings, the second roll having a larger outside diameter than the first roll and an edge of the second roll extending past an outboard edge of the first roll, the clearance between an inside surface of a part of the second roll that extends past the outboard edge of the first roll and an outside surface of the first roll being at least about 0.038 centimeter and sufficient that rapid rotation of the first roll does not cause more than a very slow rotation of the second roll so that the second roll does not jerk a slow moving new strand when the new strand first contacts the surface of the second roll of the idler roll during lacing in of the new strand, and the chopper further comprising a guide roll for guiding the item(s) running into the chopper, the guide roll being located upstream of and spaced from the chopper and a shield for the guide roll, the shield located between the guide roll and the backup roll.

* * * * *